(12) United States Patent
Winterton

(10) Patent No.: US 7,858,000 B2
(45) Date of Patent: Dec. 28, 2010

(54) METHOD OF MAKING SILICONE HYDROGEL CONTACT LENSES

(75) Inventor: Lynn Cook Winterton, Alpharetta, GA (US)

(73) Assignee: Novartis AG, Basel (CH)

( * ) Notice: Subject to any disclaimer, the term of this patent is extended or adjusted under 35 U.S.C. 154(b) by 855 days.

(21) Appl. No.: 11/810,601

(22) Filed: Jun. 6, 2007

(65) Prior Publication Data

US 2008/0174035 A1 Jul. 24, 2008

Related U.S. Application Data

(60) Provisional application No. 60/811,949, filed on Jun. 8, 2006.

(51) Int. Cl.
 *B29D 11/00* (2006.01)
(52) U.S. Cl. .................... 264/1.38; 264/1.7; 264/2.5
(58) Field of Classification Search ........... 264/1.1, 264/1.36, 1.38, 1.7, 2.5; 425/810
 See application file for complete search history.

(56) References Cited

U.S. PATENT DOCUMENTS

| | | | |
|---|---|---|---|
| 3,549,747 A | 12/1970 | Krezanoski et al. | 424/78 |
| 3,639,576 A | 2/1972 | Kaspar et al. | 424/78 |
| 3,882,036 A | 5/1975 | Krezanoski et al. | 252/106 |
| 4,013,576 A | 3/1977 | Loshaek | 252/106 |
| 4,287,175 A | 9/1981 | Katz | 424/78 |
| 4,312,575 A | 1/1982 | Peyman et al. | 351/160 H |
| 4,323,467 A | 4/1982 | Fu | 252/106 |
| 4,444,711 A | 4/1984 | Schad | 264/243 |
| 4,460,534 A | 7/1984 | Boehm et al. | 264/246 |
| 4,500,441 A | 2/1985 | Tanaka et al. | 252/89.1 |
| 4,529,535 A | 7/1985 | Sherman | 252/106 |
| 4,536,554 A | 8/1985 | Lim et al. | 526/264 |
| 4,551,461 A | 11/1985 | Sherman | 514/275 |
| 4,560,491 A | 12/1985 | Sherman | 252/106 |
| 4,568,517 A | 2/1986 | Kaspar et al. | 422/30 |
| 4,626,292 A | 12/1986 | Sherman | 134/26 |
| 4,632,844 A | 12/1986 | Yanagihara et al. | 427/488 |
| 4,746,514 A | 5/1988 | Warne | 424/445 |
| 4,783,488 A | 11/1988 | Ogunbiyi et al. | 514/635 |
| 4,786,436 A | 11/1988 | Ogunbiyi et al. | 252/352 |
| 4,983,702 A | 1/1991 | Mueller et al. | 528/28 |
| 5,008,356 A | 4/1991 | Ishimaru et al. | 526/281 |
| 5,036,971 A | 8/1991 | Seden et al. | 206/5.1 |
| 5,087,392 A | 2/1992 | Burke et al. | 264/2.7 |
| 5,087,677 A | 2/1992 | Brekner et al. | 526/160 |
| 5,141,665 A | 8/1992 | Sherman | 252/106 |
| 5,157,093 A | 10/1992 | Harisiades et al. | 527/301 |
| 5,198,477 A | 3/1993 | von der Haegen et al. | 523/106 |
| 5,260,001 A | 11/1993 | Nandu et al. | 264/2.1 |
| 5,322,667 A | 6/1994 | Sherman | 422/28 |
| 5,364,601 A | 11/1994 | Salpekar | 422/28 |
| 5,382,599 A | 1/1995 | Rupp et al. | 514/547 |
| 5,405,878 A | 4/1995 | Ellis et al. | 422/28 |
| 5,500,144 A | 3/1996 | Potini et al. | 252/174.15 |
| 5,508,317 A | 4/1996 | Muller | 522/85 |
| 5,583,463 A | 12/1996 | Merritt | 327/526 |
| 5,604,189 A | 2/1997 | Zhang et al. | 510/112 |
| 5,656,210 A | 8/1997 | Hill et al. | 264/2.6 |
| 5,665,840 A | 9/1997 | Pohlmann et al. | 526/264 |
| 5,711,823 A | 1/1998 | Ellis et al. | 134/42 |
| 5,712,356 A | 1/1998 | Bothe et al. | 526/264 |
| 5,726,733 A | 3/1998 | Lai et al. | 351/160 |
| 5,731,087 A | 3/1998 | Fan et al. | 428/412 |
| 5,760,100 A | 6/1998 | Nicolson et al. | 523/106 |
| 5,773,396 A | 6/1998 | Zhang et al. | 510/115 |
| 5,789,464 A | 8/1998 | Muller | 523/108 |
| 5,800,412 A | 9/1998 | Zhang et al. | 604/280 |
| 5,807,636 A | 9/1998 | Sheu et al. | 428/403 |
| 5,837,377 A | 11/1998 | Sheu et al. | 428/412 |
| 5,843,346 A | 12/1998 | Morrill | 264/2.5 |
| 5,849,810 A | 12/1998 | Muller | 522/85 |
| 5,849,841 A | 12/1998 | Muhlebach et al. | 525/59 |
| 5,872,086 A | 2/1999 | Ellis et al. | 510/112 |
| 5,882,687 A | 3/1999 | Park et al. | 424/682 |
| 5,894,002 A | 4/1999 | Boneerger et al. | 264/1.36 |
| 5,936,052 A | 8/1999 | Bothe et al. | 526/264 |
| 5,942,558 A | 8/1999 | Korb | 523/106 |
| 5,998,498 A | 12/1999 | Vanderlaan et al. | 523/107 |
| 6,037,328 A | 3/2000 | Hu et al. | 514/23 |
| 6,039,913 A | 3/2000 | Hirt et al. | 264/331.11 |
| 6,165,408 A | 12/2000 | Steinmann | 264/496 |
| 6,193,369 B1 | 2/2001 | Valint, Jr. et al. | 351/160 H |
| 6,207,628 B1 | 3/2001 | Soyer et al. | 510/112 |

(Continued)

FOREIGN PATENT DOCUMENTS

EP 0 139 994 B1 5/1989

(Continued)

OTHER PUBLICATIONS

Cramer et al., Mechanism and Modeling of a Thiol-Ene Photopolymerization, Macromolecules, 2003, vol. 36, pp. 4631-4636.
Cramer et al., Photopolymerizations of Thiol-Ene Polymers without Photoinitiators, Macromolecules, 2002, vol. 35, pp. 5361-5365.
Cramer et al., Thiol-Ene Photopolymerization Mechanism and Rate Limiting Step Changes for Various Vinyl Functional Group Chemistries, Macromolecules, 2003, vol. 36, pp. 7964-7969.
Evans et al., Free-Radical Ring-Opening Polymerizatino of Cyclic Allylic Sulfides, Macromolecules, 1996, vol. 29, pp. 6983-6989.
Evans et al., Free-Radical Ring-Opening Polymerization of Cyclic Allylic Sulfides. 2. Effect of Substituents on Seven- and Eight-Membered Ring Low Shrink Monomers, Macromolecules, 2000, vol. 33, pp. 6722-6731.

(Continued)

*Primary Examiner*—Mathieu D. Vargot
(74) *Attorney, Agent, or Firm*—Jian Zhou

(57) ABSTRACT

The invention provides a cost-effective method for making a silicone hydrogel contact lens which has a good wettable coating with a good durability.

20 Claims, No Drawings

U.S. PATENT DOCUMENTS

| | | | |
|---|---|---|---|
| 6,221,303 B1 | 4/2001 | Steinmann | 264/496 |
| 6,274,133 B1 | 8/2001 | Hu et al. | 424/78.04 |
| 6,303,687 B1 | 10/2001 | Muller | 252/61 |
| 6,348,507 B1 | 2/2002 | Heiler et al. | 514/769 |
| 6,367,929 B1 | 4/2002 | Maiden et al. | 351/160 H |
| 6,428,839 B1 | 8/2002 | Kunzler et al. | 427/2.1 |
| 6,440,366 B1 | 8/2002 | Salpekar et al. | 422/40 |
| 6,451,871 B1 | 9/2002 | Winterton et al. | 523/106 |
| 6,472,489 B1 | 10/2002 | Stockinger | 526/312 |
| 6,479,587 B1 | 11/2002 | Stockinger et al. | 525/131 |
| 6,482,799 B1 | 11/2002 | Tuse et al. | 514/14 |
| 6,492,478 B1 | 12/2002 | Steinmann | 526/258 |
| 6,528,048 B1 | 3/2003 | Koike et al. | 424/78.17 |
| 6,531,432 B2 | 3/2003 | Molock et al. | 510/112 |
| 6,589,665 B2 | 7/2003 | Chabrecek et al. | 428/520 |
| 6,617,291 B1 | 9/2003 | Smith | 510/112 |
| 6,627,124 B1 | 9/2003 | Herbrechtsmeier et al. | 264/1.36 |
| 6,630,243 B2 | 10/2003 | Valint, Jr. et al. | 428/420 |
| 6,634,748 B1 | 10/2003 | Vanderlaan et al. | 351/177 |
| 6,686,330 B2 | 2/2004 | Jordan, IV et al. | 510/475 |
| 6,689,480 B2 | 2/2004 | Shimoyama et al. | 428/451 |
| 6,699,435 B2 | 3/2004 | Salpekar et al. | 422/40 |
| 6,702,983 B2 | 3/2004 | Hu et al. | 422/1 |
| 6,719,929 B2 | 4/2004 | Winterton et al. | 264/1.7 |
| 6,759,491 B2 | 7/2004 | Matyjaszewski et al. | 526/90 |
| 6,793,973 B2 | 9/2004 | Winterton et al. | 427/393.5 |
| 6,805,836 B2 | 10/2004 | Salamone et al. | 422/1 |
| 6,811,805 B2 | 11/2004 | Gilliard et al. | 427/2.1 |
| 6,815,074 B2 | 11/2004 | Aguado et al. | 428/447 |
| 6,822,016 B2 | 11/2004 | McCabe et al. | 523/107 |
| 6,827,966 B2 | 12/2004 | Qiu et al. | 427/2.24 |
| 6,849,671 B2 | 2/2005 | Steffen et al. | 523/107 |
| 6,852,353 B2 | 2/2005 | Qiu et al. | 427/2.24 |
| 6,867,172 B2 | 3/2005 | Alvarez et al. | 510/112 |
| 6,893,685 B2 | 5/2005 | Qiu et al. | 427/407.1 |
| 6,896,926 B2 | 5/2005 | Qiu et al. | 427/2.31 |
| 6,902,812 B2 | 6/2005 | Valint, Jr. et al. | 428/420 |
| 6,926,965 B2 | 8/2005 | Qiu et al. | 428/411.1 |
| 6,943,203 B2 | 9/2005 | Vanderlaan et al. | 523/107 |
| 6,995,192 B2 | 2/2006 | Phelan et al. | 522/90 |
| 7,052,131 B2 | 5/2006 | McCabe et al. | 351/160 |
| 7,091,283 B2 | 8/2006 | Muller et al. | 525/292 |
| 7,165,839 B2 | 1/2007 | Winterton et al. | 351/177 |
| 7,238,750 B2 | 7/2007 | Muller et al. | 525/292 |
| 7,247,692 B2 | 7/2007 | Laredo | 526/279 |
| 7,268,189 B2 | 9/2007 | Muller et al. | 525/292 |
| 7,279,507 B2 | 10/2007 | Hu et al. | 523/106 |
| 7,329,415 B2 | 2/2008 | Lally et al. | 424/429 |
| 7,364,723 B1 | 4/2008 | Nakada et al. | 424/78.04 |
| 2001/0044482 A1 | 11/2001 | Hu et al. | 523/106 |
| 2002/0071789 A1 | 6/2002 | Molock et al. | 422/112 |
| 2002/0115578 A1 | 8/2002 | Groemminger | 510/112 |
| 2002/0182315 A1 | 12/2002 | Heiler et al. | 427/162 |
| 2003/0052424 A1 | 3/2003 | Turner et al. | 264/1.32 |
| 2003/0095230 A1 | 5/2003 | Neely et al. | 351/159 |
| 2003/0096717 A1 | 5/2003 | Xia et al. | 510/112 |
| 2003/0117579 A1 | 6/2003 | Morris et al. | 351/200 |
| 2003/0125498 A1 | 7/2003 | McCabe et al. | 528/25 |
| 2003/0130144 A1 | 7/2003 | Alvarez et al. | 510/112 |
| 2003/0162862 A1 | 8/2003 | McCabe et al. | 523/106 |
| 2003/0219909 A1 | 11/2003 | Lally et al. | 436/518 |
| 2004/0028645 A1 | 2/2004 | Chowhan | 424/78.27 |
| 2004/0115270 A1 | 6/2004 | Jani et al. | 424/486 |
| 2004/0119176 A1 | 6/2004 | Xia et al. | 264/1.32 |
| 2004/0120982 A1 | 6/2004 | Diana et al. | 424/429 |
| 2004/0135967 A1 | 7/2004 | Carney et al. | 351/159 |
| 2004/0186248 A1 | 9/2004 | Vanderlaan et al. | 525/474 |
| 2005/0006255 A1 | 1/2005 | Peck et al. | 206/5.1 |
| 2005/0008676 A1 | 1/2005 | Qiu et al. | 424/429 |
| 2005/0013842 A1 | 1/2005 | Qiu et al. | 424/423 |
| 2005/0047270 A1 | 3/2005 | Wood et al. | 366/170.3 |
| 2005/0058844 A1 | 3/2005 | Rubner et al. | 428/457 |
| 2005/0085591 A1 | 4/2005 | Dozeman et al. | 525/192 |
| 2005/0113549 A1 | 5/2005 | Devlin et al. | 528/44 |
| 2005/0117112 A1 | 6/2005 | Nayiby et al. | 351/160 |
| 2005/0134795 A1 | 6/2005 | Lally et al. | 351/177 |
| 2005/0153056 A1 | 7/2005 | Winterton et al. | 427/2.1 |
| 2005/0154080 A1 | 7/2005 | McCabe et al. | 523/107 |
| 2006/0001184 A1 | 1/2006 | Phelan et al. | 264/1.32 |
| 2006/0063852 A1 | 3/2006 | Iwata et al. | 523/106 |
| 2006/0073185 A1 | 4/2006 | Jani et al. | 424/427 |
| 2006/0074208 A1 | 4/2006 | Laredo | 526/279 |
| 2006/0142169 A1 | 6/2006 | Smith | 510/112 |
| 2007/0010595 A1 | 1/2007 | McCabe et al. | 523/106 |
| 2007/0043140 A1 | 2/2007 | Lorenz et al. | 523/106 |
| 2007/0098818 A1 | 5/2007 | Smith | 424/680 |
| 2008/0015315 A1 | 1/2008 | Chang et al. | 525/326.9 |
| 2008/0021127 A1 | 1/2008 | Muller et al. | 522/99 |
| 2008/0045612 A1 | 2/2008 | Rathore et al. | 516/102 |

FOREIGN PATENT DOCUMENTS

| | | |
|---|---|---|
| EP | 0 315 836 A2 | 5/1989 |
| EP | 0 139 994 B2 | 11/1995 |
| EP | 0 940 693 A2 | 9/1999 |
| EP | 1 187 873 B1 | 9/2004 |
| WO | WO 94/04028 | 3/1994 |
| WO | WO 95/00618 | 1/1995 |
| WO | WO 95/34327 | 12/1995 |
| WO | WO 97/20019 | 6/1997 |
| WO | WO 00/02937 | 1/2000 |
| WO | WO 00/37048 | 6/2000 |
| WO | WO 01/20997 A1 | 3/2001 |
| WO | WO 01/27174 A1 | 4/2001 |
| WO | WO 01/34312 A1 | 5/2001 |
| WO | WO 01/70837 A1 | 9/2001 |
| WO | WO 02/38161 A1 | 5/2002 |
| WO | WO 2004/055148 | 7/2004 |
| WO | WO 2004/060099 | 7/2004 |
| WO | WO 2004/091438 | 10/2004 |
| WO | WO 2005/011966 | 2/2005 |
| WO | WO 2005/014074 A1 | 2/2005 |
| WO | WO 2005/092987 | 10/2005 |
| WO | WO 2006/002894 A1 | 1/2006 |
| WO | WO 2006/038080 | 4/2006 |
| WO | WO 2006/088758 | 8/2006 |

OTHER PUBLICATIONS

Evans et al., New Free-Radical Ring-Opening Acrylate Monomers, Macromolecules, 1994, vol. 27, pp. 7935-7937.

Naciri et al., Molecular Structure and Pretilt Control of Photodimerized-Monolayers (PDML), Journal of Materials Chemistry, 2004, vol. 14, pp. 3468-3473.

Norbornene Technical Data Sheet, 2002, 6 pages.

Okay et al., Molecular Weight Development During Thiol-Ene Photopolymerizations, Macromolcules, 2005, vol. 38, pp. 4501-4511.

Scott et al., Photoinduced Plasticity in Cross-Linked Polymers, Science, 2005, vol. 308, pp. 1615-1617.

US 7,858,000 B2

METHOD OF MAKING SILICONE HYDROGEL CONTACT LENSES

This application claims the benefits under 35 USC 119(e) of the U.S. Provisional Patent Application No. 60/811,949 filed Jun. 8, 2006 herein incorporated by reference in its entirety.

The present invention is related to methods for making silicone hydrogel lenses with wettable and durable coating. The invention is also related to silicone hydrogel contact lenses with wettable and durable coating.

BACKGROUND OF THE INVENTION

In recent years, soft silicone hydrogel contact lenses, for example, Focus NIGHT & DAY™ and O2OPTIX™ (CIBA VISION), and PureVision™ (Bausch & Lomb) become more and more popular because of their high oxygen permeability and comfort. "Soft" contact lenses conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

However, a silicone hydrogel material typically has a surface or at least some areas of its surface which is hydrophobic (non-wettable). Hydrophobic surface or surface areas will up take lipids or proteins from the ocular environment and may adhere to the eye. Thus, a silicone hydrogel contact lens will generally require a surface modification.

A known method for modifying the hydrophilicity of a relatively hydrophobic contact lens material is through the use of a plasma treatment, for example, commercial lenses such as Focus NIGHT & DAY™ and O2OPTIX™ (CIBA VISION), and PureVision™ (Bausch & Lomb). Advantages of a plasma coating is its durability, relatively high hydrophilicity (or good wettability), and low susceptibility to lipid and protein deposition and adsorption. But, plasma treatment of silicone hydrogel contact lenses may not be cost effective, because the preformed contact lenses must be dried before plasma treatment and because of relative high capital investment associated with plasma treatment equipments.

Another method for modifying the hydrophilicity of a relatively hydrophobic contact lens material is a layer-by-layer (LbL) polyionic material deposition technique (see for example, U.S. Pat. Nos. 6,451,871, 6,717,929, 6,793,973, 6,884,457, 6,896,926, 6,926,965, 6,940,580). This technique can provide a cost effective process for rendering a silicone hydrogel material wettable. However, such LbL coating may be less durable than a plasma coating for extended wear purpose.

Another method for modifying the surface hydrophilicity of a silicone hydrogel contact lens is the incorporation of wetting agents into a lens formulation for making the silicone hydrogel contact lens as proposed in U.S. Pat. Nos. 6,367,929 and 6,822,016. This method may be cost effective because after cast-molding of silicone hydrogel contact lenses there is no additional posterior process required for modifying the surface hydrophilicity of the lens. However, the wetting agents may not stay effective over time and may not provide a durable wettable surface. In addition, there may be hydrophobic surface spots which can be extremely susceptible to lipid/protein adsorption and deposition.

Therefore, there is a need for a method of producing silicone hydrogel contact lenses with wettable and durable coating (surface) in a cost effective manner.

SUMMARY OF THE INVENTION

The present invention provides a method for making a silicone hydrogel contact lens, the method comprising the steps of: (a) obtaining a mold having a first mold half and a second mold half, wherein the first mold half includes a first molding surface and the second mold half includes a second molding surface, wherein the first and second mold halves are configured to receive each other such that a lens-forming cavity is formed between the first molding surface and the second molding surface; (b) applying a first transferable LbL coating to the first molding surface and a second transferable LbL coating to the second molding surface, wherein each of the first and second transferable LbL coatings comprises at least one layer of a first polyionic polymeric material and optionally at least one layer of a second polyionic material or a non-charged hydrophilic polymer with a hydrophobic backbone, wherein the first and second polyionic material each have a hydrophobic backbone and multiple ionizable or charged pendant groups, wherein the first and second polyionic materials have charges opposite to each other; (c) dispensing a silicone hydrogel lens-forming fluid material into the lens-forming cavity of the mold with the first and second transferable LbL coatings on their molding surfaces, wherein the silicone-hydrogel lens-forming material comprises a non-crosslinkable hydrophilic polymer and at least one member selected from the group consisting of a silicone-containing vinylic monomer, a silicone-containing macromer with ethylenically unsaturated groups, a crosslinkable silicone-containing prepolymer, and mixtures thereof, wherein the non-crosslinkable hydrophilic polymer is capable of forming an interfacial film at interface between the coated molding surfaces and the lens-forming fluid material; (d) soaking the transferable LbL coatings with the lens-forming fluid material for a time period sufficient both to allow the non-crosslinkable hydrophilic polymer in the interface film penetrate into the transferable LbL coatings and to entangle with coating materials in the transferable LbL coatings; and (e) curing the lens-forming material within the lens-forming cavity to form the silicone hydrogel contact lens, whereby the transferable LbL coatings detach from the molding surfaces and reattaches to the formed silicone hydrogel contact lens such that said silicone hydrogel contact lens becomes coated with the transferable LbL coatings, wherein the non-crosslinkable hydrophilic polymer has a molecular weight or structure that promotes entanglement of the non-crosslinkable hydrophilic polymer in the interfacial film with the polymer matrix of the formed lens so as to obtain a wettable surface coating with a good coating durability characterized by surviving at least five consecutive digital rubbing tests.

The present invention also provides a method for making a silicone hydrogel contact lens, the method comprising the steps of: (a) obtaining a mold having a first mold half and a second mold half, wherein the first mold half includes a first molding surface and the second mold half includes a second molding surface, wherein the first and second mold halves are configured to receive each other such that a lens-forming cavity is formed between the first molding surface and the second molding surface; (b) applying a first transferable LbL coating to the first molding surface and a second transferable LbL coating to the second molding surface, wherein each of the first and second transferable LbL coatings comprises at least one layer of a first polyionic polymeric material and optionally at least one layer of a second polyionic material or a non-charged hydrophilic polymer with a hydrophobic backbone, wherein the first and second polyionic material each have a hydrophobic backbone and multiple ionizable or charged pendant groups, wherein the first and second polyionic materials have charges opposite to each other; (c) dispensing a silicone hydrogel lens-forming fluid material into the lens-forming cavity of the mold with the first and second transferable LbL coatings on their molding surfaces, wherein the silicone-hydrogel lens-forming material comprises a non-crosslinkable hydrophilic polymer and at least one member selected from the group consisting of a silicone-containing vinylic monomer, a silicone-containing macromer with ethylenically unsaturated groups, a crosslinkable silicone-containing prepolymer, and mixtures thereof, wherein the non-crosslinkable hydrophilic polymer is capable of forming an interfacial film at interface between the coated molding surfaces and the lens-forming fluid material; (d) soaking the transferable LbL coatings with the lens-forming fluid material for a time period sufficient both to allow the non-crosslinkable hydrophilic polymer in the interface film penetrate into the transferable LbL coatings and to entangle with coating materials in the transferable LbL coatings; and (e) curing the lens-forming material within the lens-forming cavity to form the silicone hydrogel contact lens, whereby the transferable LbL coatings detach from the molding surfaces and reattaches to the formed silicone hydrogel contact lens such that said silicone hydrogel contact lens becomes coated with the transferable LbL coatings, wherein the non-crosslinkable hydrophilic polymer has a molecular weight or structure that promotes entanglement of the non-crosslinkable hydrophilic polymer in the interfacial film with the polymer matrix of the formed lens so as to obtain a wettable surface coating with a good coating durability characterized by surviving at least five consecutive digital rubbing tests.

This and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "hydrogel" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylentically unsaturated group" is employed herein in a broad sense and is intended to encompass any groups containing at least one $>C=C<$ group. Exemplary ethylenically unsaturated groups include without limitation acryloyl, methacryloyl, allyl, vinyl, styrenyl, or other $C=C$ containing groups.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains ethylenically unsaturated groups capable of undergoing further polymerizing and/or crosslinking reactions. Medium and high molecular weight typically means average molecular weights greater than 700 Daltons. Preferably, a macromer contains ethylenically unsaturated groups and can be polymerized actinically or thermally.

A "prepolymer" refers to a starting polymer which contains ethylenically unsaturated groups and can be cured (e.g., crosslinked and/or polymerized) actinically or thermally to obtain a crosslinked and/or polymerized polymer having a molecular weight much higher than the starting polymer.

A "silicone-containing prepolymer" refers to a prepolymer which contains silicone and can be crosslinked upon actinic radiation or thermally to obtain a crosslinked polymer having a molecular weight much higher than the starting polymer.

A "polymer" means a material formed by polymerizing/crosslinking one or more monomers.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatial limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

The term "fluid" as used herein indicates that a material is capable of flowing like a liquid.

"LbL coating", as used herein, refers to a coating that is not covalently attached to a contact lens or a mold half and is obtained through a layer-by-layer ("LbL") deposition of polyionic (or charged) and/or non-charged materials on the lens or mold half. An LbL coating can be composed of one or more layers, preferably one or more bilayers.

As used herein, a "polyionic material" refers to a polymeric material that has a plurality of charged groups or ionizable groups, such as polyelectrolytes, p- and n-type doped conducting polymers. Polyionic materials include both polycationic (having positive charges) and polyanionic (having negative charges) materials.

The term "bilayer" is employed herein in a broad sense and is intended to encompass: a coating structure formed on a contact lens or a mold half by alternatively applying, in no particular order, one layer of a first polyionic material (or charged material) and subsequently one layer of a second polyionic material (or charged material) having charges opposite of the charges of the first polyionic material (or the charged material); or a coating structure formed on a contact lens or mold half by alternatively applying, in no particular order, one layer of a first charged polymeric material and one layer of a non-charged polymeric material or a second charged polymeric material. It should be understood that the layers of the first and second coating materials (described above) may be intertwined with each other in the bilayer.

Formation of an LbL coating on a contact lens or mold half may be accomplished in a number of ways, for example, as described in U.S. Pat. Nos. 6,451,871, 6,719,929, 6,793,973, 6,811,805, 6,896,926 (herein incorporated by references in their entirety).

An "innermost layer", as used herein, refers to the first layer of an LbL coating, which is applied onto the surface of a contact lens or mold half.

A "capping layer" or "outmost layer", as used herein, refers to the last layer or the sole layer of an LbL coating which is applied onto a contact lens or mold half.

An "average contact angle" refers to a water contact angle (advancing angle measured by Wilhelmy Plate method), which is obtained by averaging measurements of at least 3 individual contact lenses.

As used herein, "increased surface hydrophilicity" or "increased hydrophilicity" in reference to a coated contact lens means that the coated contact lens has a reduced averaged contact angle relative to an uncoated contact lens, wherein both coated and uncoated contact lens are made of the same core material.

As used herein, "surviving a digital rubbing test" in reference to a coating on a contact lens means that after digitally rubbing the lens with Solo-care® (CIBA Vision) or an equivalent, there is no noticeable increase in staining area on the lens relative to the staining of a lens of same without rubbing, as described in Example 1. In accordance with the invention, a silicone hydrogel contact lens of the invention has a coating that is capable of surviving at least 5, preferably at least 10, more preferably at least 20, even more preferably at least 25 consecutive digital rubbing tests.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

"Stabilized antimicrobial metal nanoparticles" refer to antimicrobial metal nanoparticles which are stabilized by a stabilizer during their preparation. Stabilized antimicrobial metal nano-particles can be either positively charged or negatively charged or neutral, largely depending on a material (or so-called stabilizer) which is present in a solution for preparing the nano-particles and can stabilize the resultant nano-particles. A stabilizer can be any known suitable material. Exemplary stabilizers include, without limitation, positively charged polyionic materials, negatively charged polyionic materials, polymers, surfactants, salicylic acid, alcohols and the like.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3 oxygen)/(cm^2)(sec)(mm^2 Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3 oxygen)(mm)/(cm^2)(sec)(mm^2 Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where
n'=rate of ion transport [mol/min]
A=area of lens exposed [$mm^2$]
D=Ionoflux Diffusion Coefficient [$mm^2$/min]
dc=concentration difference [mol/L]
dx=thickness of lens [mm]

The Ionoton Ion Permeability Coefficient, P, is then determined in accordance with the following equation:

$$\ln(1-2C(t)/C(0)) = -2APt/Vd$$

where:
C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5 \times 10^{-6}$ $mm^2$/min is preferred, while greater than about $2.6 \times 10^{-6}$ $mm^2$/min is more preferred and greater than about $6.4 \times 10^{-6}$ $mm^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

The term "oxyperm component in a polymerizable composition" as used herein, refers to monomers, oligomers, macromers, and the like, and mixtures thereof, which are capable of polymerizing with like or unlike polymerizable materials to form a polymer which displays a relatively high rate of oxygen diffusion therethrough.

In general, the invention is directed to a cost-effective method for making silicone hydrogel contact lenses with durable hydrophilic coatings. The invention is partly based on the discovery that by first forming a transferable LbL coating on the molding surfaces of a mold for making a silicone hydrogel contact lens and then by incorporate a selected non-crosslinkable hydrophilic polymer in a silicone hydrogel lens-forming fluid composition, a silicone hydrogel contact lens with a durable coating can be obtained by cast molding without surface treatment posterior to cast molding. It is believed that an internal wetting agent (i.e., in the lens-forming material) can form an interfacial film at the interface between a mold with transferable LbL coating and the lens-forming composition therein, prior to curing the lens-forming composition. Wetting agent in this interfacial film may penetrate into the transfer LbL coating and entangle with coating materials in the transferable LbL coating to function as anchors for enforcing the bonding (non-covalently bonding) of the transfer LbL coating to a formed silicone hydrogel lens. The interfacial film of the wetting agent may also improve the intactness of the coating of the resultant lens. It is also believed that molecules of an internal wetting agent in the interfacial film should have significant portion(s) (e.g., relatively long tails or dangling polymer chain segments) of its structure which can extend outwardly from the interfacial film into the lens-forming composition and subsequently can be entrapped within and become entangled with the polymer matrix of a formed lens. Such entrapment and entanglements of the internal wetting agent within the transferable LbL coating and the polymer matrix of the resultant lens may significantly improve the durability of the coating of the resultant silicone hydrogel contact lens.

The present invention also provides a method for making a silicone hydrogel contact lens, the method comprising the steps of: (a) obtaining a mold having a first mold half and a second mold half, wherein the first mold half includes a first molding surface and the second mold half includes a second molding surface, wherein the first and second mold halves are configured to receive each other such that a lens-forming cavity is formed between the first molding surface and the second molding surface; (b) applying a first transferable LbL coating to the first molding surface and a second transferable LbL coating to the second molding surface, wherein each of the first and second transferable LbL coatings comprises at least one layer of a first polyionic polymeric material and optionally at least one layer of a second polyionic material or a non-charged hydrophilic polymer with a hydrophobic backbone, wherein the first and second polyionic material each have a hydrophobic backbone and multiple ionizable or charged pendant groups, wherein the first and second polyionic materials have charges opposite to each other; (c) dispensing a silicone hydrogel lens-forming fluid material into the lens-forming cavity of the mold with the first and second transferable LbL coatings on their molding surfaces, wherein the silicone-hydrogel lens-forming material comprises a non-crosslinkable hydrophilic polymer and at least one member selected from the group consisting of a silicone-containing vinylic monomer, a silicone-containing macromer with ethylenically unsaturated groups, a crosslinkable silicone-containing prepolymer, and mixtures thereof, wherein the non-crosslinkable hydrophilic polymer is capable of forming an interfacial film at interface between the coated molding surfaces and the lens-forming fluid material; (d) soaking the transferable LbL coatings with the lens-forming fluid material for a time period sufficient both to allow the non-crosslinkable hydrophilic polymer in the interface film penetrate into the transferable LbL coatings and to entangle with coating materials in the transferable LbL coatings; and (e) curing the lens-forming material within the lens-forming cavity to form the silicone hydrogel contact lens, whereby the transferable LbL coatings detach from the molding surfaces and reattaches to the formed silicone hydrogel contact lens such that said silicone hydrogel contact lens becomes coated with the transferable LbL coatings, wherein the non-crosslinkable hydrophilic polymer has a molecular weight or structure that promotes entanglement of the non-crosslinkable hydrophilic polymer in the interfacial film with the polymer matrix of the formed lens so as to obtain a wettable surface coating with a good coating durability characterized by surviving at least five consecutive digital rubbing tests.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz glass and sapphire.

In a preferred embodiment, reusable molds are used and the silicone-hydrogel lens-forming material is cured actinically under a spatial limitation of actinic radiation to form a silicone hydrogel contact lens. Examples of preferred reusable molds are those disclosed in U.S. Patent Application Publication No. US 2004-0178541 A1 and U.S. Pat. Nos. 6,627,124, 6,800,225, which are incorporated by reference in their entireties.

In accordance with the present invention, an LbL coating can be applied to the molding surface of a mold half by contacting the molding surface with one or more coating solutions according to various methods, such as, for examples those methods disclosed in U.S. Pat. Nos. 6,451,871, 6,719, 929, 6,793,973, 6,811,805, 6,896,926, which are incorporated herein by references in their entireties.

Contacting of the molding surface of a mold half with a coating solution can occur by dipping it into the coating solution or by spraying it with the coating solution. One coating process involves solely dip-coating and optionally dip-rinsing steps. Another coating process involves solely spray-coating and spray-rinsing steps. However, a number of alternatives involve various combinations of spray- and dip-coating and rinsing steps may be designed by a person having ordinary skill in the art.

For example, a solely dip-coating process for forming an LbL coating composed of at least one bilayers on the molding surface of a mold half involves the steps of: (a) immersing a mold half in a first coating solution of a first coating material; (b) optionally rinsing the mold half by immersing it in a first rinsing solution; (c) immersing the mold half in a second coating solution of a second coating material to form a first bilayer of the first and second coating materials; (d) optionally rinsing the mold half by immersing it in the rinsing solution; and (e) optionally repeating steps (a) to (d) for a number of times to form additional bilayers. A thicker LbL coating can be produced by repeating steps (a) to (d) preferably for 2 to 40 times.

The immersion time for each of the coating and optional rinsing steps may vary depending on a number of factors. Preferably, immersion of the core material into a coating solution occurs over a period of about 1 to 30 minutes, more preferably about 1 to 20 minutes, and most preferably about 1 to 5 minutes. Rinsing may be accomplished with a plurality of rinsing steps, but a single rinsing step, if desired, can be quite efficient.

Another exemplary coating process for forming an LbL coating composed of at least one bilayers on the molding surface of a mold half is a single dip-coating process as described in U.S. Pat. No. 6,793,973. Such single dip-coating process involves dipping a mold half in a solution containing a first coating material and a second coating material in an amount such that the molar charge ratio of said solution is from about 3:1 to about 100:1. Multiple bilayers can be formed on the molding surface of a mold half by using this single dip-coating process.

A further exemplary coating process for forming an LbL coating composed of at least one bilayers on the molding surface of a mold half involves a series of spray coating techniques. For example, a solely spray-coating process generally includes the steps of: (a) spraying the molding surface of a mold half with a first coating solution of a first coating material; (b) optionally rinsing the mold surface by spraying it with a rinsing solution; (c) spraying the molding surface with a second coating solution of a second coating material to form a first bilayer of the first and second coating materials; (d) optionally rinsing the molding surface by spraying it with the rinsing solution; (e) optionally repeating steps (a) to (d) for a number of times. A thicker LbL coating can be produced by repeating steps (a) to (d) preferably for 2 to 40 times.

The spray coating application may be accomplished via a process selected from the group consisting of an air-assisted atomization and dispensing process, an ultrasonic-assisted atomization and dispensing process, a piezoelectric assisted atomization and dispensing process, an electromechanical jet printing process, a piezo-electric jet printing process, a piezo-electric with hydrostatic pressure jet printing process, and a thermal jet printing process; and a computer system capable of controlling the positioning of the dispensing head of the spraying device on the ophthalmic lens and dispensing the coating liquid. Those spraying coating processes are described in U.S. Pat. No. 6,811,805.

In accordance with the invention, coating materials for forming transferable LbL coating include, without limitation, polyionic materials, non-charged polymeric materials, polymerized vesicles (liposomes and micelles) with surface charges, charged antimicrobial metal nanoparticles (preferably charged silver nano-particles), and charged antimicrobial metal-containing nanoparticles (preferably charged silver-containing nanoparticles).

The polyionic materials that may be employed in the present invention include polyanionic and polycationic polymers with a hydrophobic backbone and charged or ionizable pendant groups. Preferably, the polyionic materials are polyanionic polymers.

Examples of suitable polyanionic polymers include, without limitation a linear polyacrylic acid (PAA), a branched polyacrylic acid, a polymethacrylic acid (PMA), a polyacrylic acid or polymethacrylic acid copolymer, a maleic or fumaric acid copolymer, a poly(styrenesulfonic acid) (PSS). Examples of a branched polyacrylic acid include a Carbophil® or Carbopol® type from Goodrich Corp. Examples of a copolymer of acrylic or methacrylic acid include a copolymerization product of an acrylic or methacrylic acid with a vinyl monomer including, for example, acrylamide, N,N-dimethyl acrylamide or N-vinylpyrrolidone. A preferred polyanionic polymer with a hydrophobic backbone is a linear or branched polyacrylic acid or an acrylic acid copolymer. A more preferred anionic polymer is a linear or branched polyacrylic acid. A branched polyacrylic acid in this context is to be understood as meaning a polyacrylic acid obtainable by polymerizing acrylic acid in the presence of suitable (minor) amounts of a di- or multi-vinyl compound.

Examples of polycationic polymers with a hydrophobic backbone include, without limitation, a polyallylamine (PAH), a polyethyleneimine (PEI), a polyvinylamine, a poly(vinylbenzyl-tri-$C_1$-$C_4$-alkylammonium salt), poly(vinylpyridinium salt), polyquat. The above mentioned polymers comprise in each case the free amine, a suitable salt thereof as well as any quaternized form, if not specified otherwise.

Any suitable non-charged hydrophilic polymers with a hydrophobic backbone can be used in the invention. They are preferably polyvinyl alcohols (PVAs), more preferably a homopolymer of a vinyl lactam, a copolymer of at least one vinyl lactam in the presence or in the absence of one or more hydrophilic vinylic comonomers, or mixtures thereof.

PVA is a highly biocompatible material used widely in ophthalmic products, especially wetting drops or artificial tears for ocular comfort (e.g., HypoTears™, etc.). PVAs of all kinds, for example those with low, medium or high polyvinyl acetate contents may be employed. Polyvinyl alcohols employed in the present invention are known and are commercially available, for example under the brand name Mowiol® from KSE (Kuraray Specialties Europe).

In accordance with the invention, the vinyl lactam has a structure of formula (I)

wherein R is an alkylene di-radical having from 2 to 8 carbon atoms; $R_1$ is hydrogen, alkyl, aryl, aralkyl or alkaryl, preferably hydrogen or lower alkyl having up to 7 carbon atoms, and, more preferably, up to 4 carbon atoms, such as, for example, methyl, ethyl or propyl; aryl having up to 10 carbon atoms, and also aralkyl or alkaryl having up to 14 carbon atoms; and $R_2$ is hydrogen or lower alkyl having up to 7 carob atoms and, more preferably, up to 4 carbon atoms, such as, for example, methyl, ethyl or propyl.

A preferred non-charged hydrophilic polymer is a copolymer derived from a vinyl lactam which is a heterocyclic monomer of formula (I) containing from 4 to 6 carbon atoms in the heterocyclic ring, or a mixture thereof. A more preferred non-charged hydrophilic polymer is a copolymer derived from a vinyl lactam which is a heterocyclic monomer of formula (I) containing 4 carbon atoms in the heterocyclic ring, or a mixture thereof. An even more preferred non-charged hydrophilic polymer is a copolymer derived from a vinyl lactam which is a heterocyclic monomer of formula (I) containing 4 carbon atoms in the heterocyclic ring and wherein $R_1$ and $R_2$ are each independently of the other hydrogen or lower alkyl, or a mixture thereof. A most preferred non-charged hydrophilic polymer is polyvinylpyrrolidone (PVP).

In accordance with the present invention, coating solutions can be prepared in a variety of ways. Preferably, a coating solution can be formed by dissolving a coating material in water. The concentration of a coating material in a solution can generally vary depending on the particular materials being utilized, the desired coating thickness, and a number of other factors. It may be typical to formulate a relatively dilute aqueous solution of a coating material. For example, a coating material concentration can be between about 0.0001% to about 0.25% by weight, between about 0.005% to about 0.10% by weight, or between about 0.01% to about 0.05% by weight.

In order to alter various characteristics of the coating, such as thickness, the molecular weight of the coating materials can be varied. In particular, as the molecular weight is increased, the coating thickness generally increases.

In accordance with the invention, a transferable LbL coating comprises at least one layer of a first polyionic material. The first polyionic material can be any charged material, such as a polyanionic polymeric material, a polycationic polymeric material, polymerized vesicles with surface charges, charged antimicrobial metal nanoparticles (preferably charged silver nano-particles), charged antimicrobial metal-containing nanoparticles (preferably charged silver-containing nanoparticles), or mixtures thereof. The first polyionic material is preferably a polyanionic polymer or a polycationic polymer.

The transferable LbL coating can further comprises at least one layer of a second coating material, wherein the second coating material can be non-covalently bound to the first polyionic material. The second coating material can be a polyionic material having charges opposite of the first polyionic material or a non-charged polymeric material capable of being bound to the first polyionic material as disclosed in U.S. Pat. No. 6,926,965 (herein incorporated by reference in its entirety). Preferred non-charged polymeric materials include without limitation homopolymers of a vinyl lactam, copolymers of at least one vinyl lactam in the presence or in the absence of one or more hydrophilic vinylic monomers, or mixtures thereof.

In a preferred embodiment, the transferable LbL coating on the molding surface comprises one outmost layer of a polyionic polymeric material.

In another preferred embodiment, the transferable LbL coating on the molding surface comprises at least one bilayer of a polyanionic polymeric material and a polycationic polymeric material.

In another preferred embodiment, the transferable LbL coating on the molding surface comprises at least one bilayer of a polyionic polymeric material and a non-charged polymeric material capable of being non-covalently bound to the polyionic polymeric material.

In another preferred embodiment, the transferable LbL coating on the molding surface comprises at least one layer of a lubricious coating material which is selected from the group consisting of PAMAM dendrimers, PAAm-co-PAA, PVP-co-PAA, glycosaminoglycanes, fucoidan, poly-aspartic acid, poly-glutamic acid, carboxymethyl cellulose, carboxymethyl dextrans, alginates, pectins, gellan, carboxyalkyl chitins, carboxymethyl chitosans, sulfated polysaccharides, glucoproteins, and aminoalkylated polysaccharides.

In a more preferred embodiment, the transferable coating comprises at least one layer of polyacrylic acid (PAA) and at least one layer of polyvinylpyrrolidone.

A transferable LbL coating can comprise two or more bilayers. A preferred number of bilayers in a transferable LbL coating are about 2 to about 20 bilayers. While more than 20 bilayers are possible, it has been found that delamination may occur in some LbL coatings having an excessive number of bilayers. A more preferred number of bilayers is about 2 to about 10 bilayers.

In a preferred embodiment, the first and second transferable LbL coatings are identical to each other.

In another preferred embodiment, the first and second transferable LbL coatings are different from each other. Under such circumstance, a resultant silicone hydrogel contact lens has asymmetrical coatings thereon. As used herein, "asymmetrical coatings" on a contact lens refers to the different coatings on the anterior surface and the opposite posterior surface of the contact lens. As used herein, "different coatings" refers to two coatings that have different compositions. For example, the first transferable LbL coating comprises at least one layer of a polyanionic material and at least one layer of a non-charged hydrophilic polymer with a hydrophobic backbone, whereas the second transferable LbL coating comprises at least one layer of a polyanionic material and at least one layer of a polycationic material. With asymmetrical coatings, a contact lens may have different surface properties and/or functionalities.

A "silicone hydrogel lens-forming material" refers to a polymerizable composition which can be cured (i.e., polymerized and/or crosslinked) thermally or actinically or chemically to obtain a crosslinked silicone-containing polymer. Lens-forming materials are well known to a person skilled in the art. In accordance with the invention, a silicone hydrogel lens-forming material comprises at least one silicon-containing monomer or macromer, or can be any lens formulations for making soft contact lenses. Exemplary lens formulations include without limitation the formulations of lotrafilcon A, lotrafilcon B, etafilcon A, genfilcon A, lenefilcon A, polymacon, acquafilcon A, balafilcon, senofilcon A, and the like. A lens-forming material can further include other components, such as an initiator (e.g., a photoinitiator or a thermal initiator), a visibility tinting agent, UV-blocking agent, photosensitizers, and the like. Preferably, a silicone hydrogel lens-forming material used in the present invention comprises a silicone-containing macromer.

Examples of silicone-containing monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris(pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

Examples of silicone-containing prepolymers include without limitation those disclosed in US Patent Application Publication No. US 2001-0037001 A1 and U.S. Pat. No. 6,039,913, which are incorporated herein by references in their entireties. Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

In accordance with the present invention, a silicone hydrogel lens-forming material can also comprise a hydrophilic vinylic monomer. Nearly any hydrophilic vinylic monomer that can act as a plasticizer can be used in the fluid composition of the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A silicone hydrogel lens-forming material can also comprises a hydrophobic monomer. By incorporating a certain amount of hydrophobic vinylic monomer in a polymerizable fluid composition, the mechanical properties (e.g., modulus of elasticity) of the resultant polymer may be improved.

A silicone hydrogel lens-forming material can further comprise an antimicrobial agent, preferably antimicrobial metal nanoparticles, more preferably silver nanoparticles.

In accordance with the present invention, a silicone hydrogel lens-forming material can further comprise various components, such as cross-linking agents, a chain transfer agent, initiator, UV-absorbers, inhibitors, fillers, visibility tinting agents (e.g., dyes, pigments, or mixtures thereof), and the like, as known to a person skilled in the art.

In accordance with the present invention, a silicone hydrogel lens-forming material can be a solution or a solvent-free liquid or melt at a temperature below 90° C. A person skilled in the art will known well how to prepare silicone hydrogel lens-forming material.

In accordance with the present invention, a silicone hydrogel lens-forming material can be a solution or a solvent-free liquid or melt at a temperature below 60° C.

Any non-crosslinkable hydrophilic polymers can be used in the invention. Exemplary non-crosslinkable hydrophilic polymers include, but are not limited to, polyvinylalcohols (PVAs), polyethylene oxide, polyethylene-polypropylene block copolymers, polyamides, polyimides, polylactone, a homopolymer of a vinyl lactam of formula (I) shown above, a copolymer of at least one vinyl lactam of formula (I) shown above in the presence or in the absence of one or more hydrophilic vinylic comonomers, a homopolymer of acrylamide or methaacrylamide, a copolymer of acrylamide or methacrylamide with one or more hydrophilic vinylic monomers, mixtures thereof.

A non-crosslinkable hydrophilic polymer is present in the silicone hydrogel lens-forming material in an amount sufficient to render a formed silicone hydrogel lens having a wettable and durable coating, for example, in an amount of from about 0.5% to about 10% by weight, preferably from about 1% to about 8.0% by weight, and more preferably from about 3% to about 6% by weight, each based on the entire weight of the composition.

The number-average molecular weight $M_n$ of a non-crosslinkable hydrophilic polymer is at least 40000 daltons, preferably at least 80000 daltons, more preferably at least 100000 daltons, even more preferably at least 250000 daltons.

Examples of hydrophilic polymers include but are not limited to polyvinylalcohol (PVA), polyethylene oxide (i.e., polyethyleneglycol (PEG)), poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl4,5-dimethyl-2-pyrrolidone, polyvinylimidazole, poly-N—N-dimethylacrylamide, polyacrylic acid, poly 2 ethyl oxazoline, heparin polysaccharides, polysaccharides, a polyoxyethylene derivative, mixtures thereof.

A suitable polyoxyethylene derivative is, for example, a n-alkylphenyl polyoxyethylene ether, n-alkyl polyoxy-ethylene ether (e.g., TRITON®), polyglycol ether surfactant (TERGITOL®), polyoxyethylenesorbitan (e.g., TWEEN®), polyoxyethylated glycol monoether (e.g., BRIJ®, polyoxylethylene 9 lauryl ether, polyoxylethylene 10 ether, polyoxylethylene 10 tridecyl ether), or a block copolymer of ethylene oxide and propylene oxide (e.g. poloxamers or poloxamines).

A class of preferred polyoxyethylene derivatives used in the present invention are polyethylene-polypropylene block copolymers, in particular poloxamers or poloxamines which are available, for example, under the tradename PLURONIC®, PLURONIC-R®, TETRONIC®), TETRONIC-R® or PLURADOT®.

Poloxamers are triblock copolymers with the structure PEO-PPO-PEO (where "PEO" is poly(ethylene oxide) and "PPO" is poly(propylene oxide). A considerable number of poloxamers is known, differing merely in the molecular weight and in the PEO/PPO ratio; Examples are poloxamer 101, 105, 108, 122, 123, 124, 181, 182, 183, 184, 185, 188, 212, 215, 217, 231, 234, 235, 237, 238, 282, 284, 288, 331, 333, 334, 335, 338, 401, 402, 403 and 407. The poloxamers may be used in the process of the invention irrespective of their PEO/PPO ratio; for example, poloxamer 101 having a PEO/PPO weight ratio of about 10/90 and poloxamer 108 having a PEO/PPO weight ratio of about 80/20 both have been found to be valuable as non-crosslinkable polymer in the aqueous solution according to step a).

The order of polyoxyethylene and polyoxypropylene blocks can be reversed creating block copolymers with the structure PPO-PEO-PPO, which are known as PLURONIC-R® polymers.

Poloxamines are polymers with the structure $(PEO-PPO)_2$-N—$(CH_2)_2$—N-$(PPO-PEO)_2$ that are available with different molecular weights and PEO/PPO ratios. Again, the order of polyoxyethylene and polyoxypropylene blocks can be reversed creating block copolymers with the structure $(PPO-PEO)_2$-N—$(CH_2)_2$—N-$(PEO-PPO)_2$, which are known as TETRONIC-R® polymers.

Polyoxypropylene-polyoxyethylene block copolymers can also be designed with hydrophilic blocks comprising a random mix of ethylene oxide and propylene oxide repeating units. To maintain the hydrophilic character of the block, ethylene oxide will predominate. Similarly, the hydrophobic block can be a mixture of ethylene oxide and propylene oxide repeating units. Such block copolymers are available under the tradename PLURADOT®.

PVA is a highly biocompatible material used widely in ophthalmic products, especially wetting drops or artificial tears for ocular comfort (e.g., HypoTears™, etc.). Non-crosslinkable PVAs of all kinds, for example those with low, medium or high polyvinyl acetate contents may be employed. The non-crosslinkable polyvinyl alcohols employed in the present invention are known and are commercially available, for example under the brand name Mowiol® from KSE (Kuraray Specialties Europe).

Preferably, a silicone-hydrogel lens-forming material comprises at least one high molecular weight non-crosslinkable PVA with a $M_n$ of from above 50000 to 100000, preferably from above 50000 to 75000 and at least one low molecular weight non-crosslinkable PVA with a $M_n$ of from 25000 to 50000, preferably from 30000 to 50000.

In case of two or more different non-crosslinkable PVAs, the total amount thereof in the composition is as described before including the preferences given. The weight proportion of the lower molecular weight and higher molecular weight non-crosslinkable PVA may vary within broad ranges, but is, for example, from 1:1 to 5:1, preferably from 1:1 to 4:1, and in particular from 1:1 to 3:1.

A mixture of non-crosslinkable PVAs and polyethyleneglycol (PEG) can be used in the invention. PVA and PEG may have synergy for enhancing surface wettability of a silicone hydrogel contact lens.

In accordance with the present invention, a silicone hydrogel lens-forming material can further comprise various components, such as cross-linking agents, initiator, UV-absorbers, inhibitors, fillers, visibility tinting agents (e.g., dyes, pigments, or mixtures thereof), and the like.

Cross-linking agents may be used to improve structural integrity and mechanical strength. Examples of cross-linking agents include without limitation allyl(meth)acrylate, lower alkylene glycol di(meth)acrylate, poly lower alkylene glycol di(meth)acrylate, lower alkylene di(meth)acrylate, divinyl ether, divinyl sulfone, di- or trivinylbenzene, trimethylolpropane tri(meth)acrylate, pentaerythritol tetra(meth)acrylate, bisphenol A di(meth)acrylate, methylenebis(meth)acrylamide, triallyl phthalate or diallyl phthalate. A preferred cross-linking agent is ethylene glycol dimethacrylate (EGDMA).

The amount of a cross-linking agent used is expressed in the weight content with respect to the total polymer and is preferably in the range from 0.05 to 5%, and more preferably in the range from 0.1 to 2%.

Initiators, for example, selected from materials well known for such use in the polymerization art, may be included in the polymerizable fluid composition in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis (2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom D M Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

In a preferred embodiment, a polymerizable fluid composition suitable for making an ophthalmic device will include (a) about 20 to 40 weight percent of a siloxane-containing macromer with ethylenically unsaturated groups, (b) about 5 to 30 weight percent of a siloxane-containing vinylic monomer, and (c) about 10 to 35 weight percent of a hydrophilic monomer. More preferably, the siloxane-containing vinylic monomer is TRIS.

In another preferred embodiment, where a lens-forming material is a solution (dissolved in water, a mixture of water and a water miscible organic solvent, or an organic solvent), solvent-free liquid, or melt of one or more silicone-containing prepolymers with ethylenically unsaturated groups optionally in presence of other components, reusable molds are used and the lens-forming material is cured actinically under a spatial limitation of actinic radiation to form a contact lens. Examples of silicone-containing prepolymers include without limitation those disclosed in US Patent Application Publication No. US 2001-0037001 A1 and U.S. Pat. No. 6,039, 913, which are incorporated herein by references in their entireties. Examples of preferred reusable molds are those disclosed in U.S. Patent Application Publication No. US 2004-0178541 A1 and U.S. Pat. Nos. 6,627,124, 6,800,225, which are incorporated by reference in their entireties. In this preferred embodiment, preferably the lens-forming material is substantially free of vinylic monomers and the silicone-containing prepolymer is substantially purified prior to making the lens-forming material (formulation). As such, no extraction step is necessary after cast-molding step and the production cost can be reduced.

In this case, the lens-forming material is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, sapphire molds to be used, since, following the production of a lens, these molds can be cleaned rapidly and effectively off the uncrosslinked prepolymer and other residues, using water or a suitable solvent, and can be dried with air. Reusable molds can also be made of a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. Patent Application Publication No. US 2004-0178541 A1 and U.S. Pat. Nos. 6,627,124, 6,800,225, which are incorporated by reference in their entireties.

A spatial limitation of actinic radiation (or the spatial restriction of energy impingement) can be effected by masking for a mold that is at least partially impermeable to the particular form of energy used, as illustrated in U.S. Pat. Nos. 6,627,124, 6,800,225 (herein incorporated by reference in their entireties) or by a mold that is highly permeable, at least at one side, to the energy form causing the crosslinking and that has mold parts being impermeable or of poor permeability to the energy, as illustrated in U.S. Patent Application Publication No. US 2004-0178541 A1 and U.S. Pat. Nos. 6,627,124, 6,800,225 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

In another preferred embodiment, a silicone hydrogel lens-forming material further comprises at least one antimicrobial agent, preferably silver nanoparticles in an amount sufficient to impart to the resultant silicone hydrogel material an antimicrobial activity characterized by having at least a 5-fold reduction ($\geq$80% inhibition), preferably at least a 1-log reduction ($\geq$90% inhibition), more preferably at least a 2-log reduction ($\geq$99% inhibition), of viable microorganisms (e.g., *Pseudomonas aeruginosa* GSU # 3, or *Staphylococcus aureus* ATCC #6538), preferably by having a prolong antimicrobial activity (i.e., effective antimicrobial activity after direct contact with a body fluid over an extended period of time). Antimicrobial activity can be determined according to procedure described in the Examples of U.S. Patent Application Publication No. US 2005-0013842 A1 (herein incorporated by reference in its entirety).

As used herein, a "prolong antimicrobial activity" is characterized by having at least a 5-fold reduction ($\geq$80% inhibition), preferably at least a 1-log reduction ($\geq$90% inhibition), more preferably at least a 2-log reduction ($\geq$99% inhibition), of viable microorganisms (e.g., *Pseudomonas aeruginosa* GSU # 3, or *Staphylococcus aureus* ATCC #6538) after at least 5, preferably at least 10, more preferably at least 20, even more preferably at least 30 consecutive soaking/rinsing cycles, each cycle comprising soaking/rinsing one lens in a phosphate buffered saline (PBS) for a period of time from about 24 to about 72 hours, as shown in the Examples of U.S. Patent Application Publication No. US 2005-0013842 A1 (herein incorporated by reference in its entirety).

In accordance with the invention, the soaking time is preferably shorter than about 20 minutes, more preferably shorter than about 10 minutes, even more preferably shorter than about 5 minutes.

In a preferred embodiment, the lens-forming fluid material has a temperature of from about 45° C. to about 95° C. At such a relative high temperature, the soaking of the transferable LbL coatings with the lens-forming fluid material can be accelerated. Moreover, it is believed that at a relatively high temperature, the structure of the non-crosslinkable hydrophilic polymer may not be tightly compact (or aggregated) but may likely be extended (i.e., with the chains extending out) so that portions of the non-crosslinkable hydrophilic polymer in the interfacial film can extend into the polymer matrix of a formed lens, thereby increasing the durability of the coatings on the formed contact lenses.

A resultant contact lens has a wettable and durable coating characterized by surviving at least 5 consecutive digital rubbing tests.

A resultant contact lens has an oxygen permeability of at least 40 barres, preferably at least about 50 barrers, more preferably at least about 65 barrers, even more preferably at least about 80 barrers. In accordance with the invention, an oxygen permeability is an apparent (directly measured when testing a sample with a thickness of about 100 microns) oxygen permeability according to procedures described in Examples.

A resultant contact lens can further have a elastic modulus of about 1.5 MPa or less, preferably about 1.2 MPa or less, more preferably about 1.0 or less, even more preferably from about 0.4 MPa to about 1.0 MPa.

A resultant contact lens further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A resultant contact lens further has a water content of preferably from about 18% to about 55%, more preferably from about 20% to about 38% by weight when fully hydrated. The water content of a silicone hydrogel contact lens can be measured according to Bulk Technique as disclosed in U.S. Pat. No. 5,849,811.

In another aspect, the invention provide a method for making a silicone hydrogel contact lens, comprising the steps of: (a) cast-molding a silicone hydrogel contact lens from a silicone hydrogel lens-forming material, wherein the silicone-hydrogel lens-forming material comprises a non-crosslinkable hydrophilic polymer with a hydrophobic backbone and at least one member selected from the group consisting of a silicone-containing vinylic monomer, a silicone-containing macromer with ethylenically unsaturated groups, a crosslinkable silicone-containing prepolymer, and mixtures thereof; (b) applying a LbL coating onto the resultant silicone hydrogel contact lens at a temperature from about 45° C. to about 95° C., wherein the LbL coating comprises at least one layer of a first polyionic polymeric material and optionally at least one layer of a second polyionic material or a non-charged hydrophilic polymer with a hydrophobic backbone, wherein the first and second polyionic material each have a hydrophobic backbone and multiple ionizable or charged pendant groups, wherein the non-crosslinkable hydrophilic polymer has a molecular weight or structure that promotes entanglement of the non-crosslinkable hydrophilic polymer in the interfacial film with the polymer matrix of the formed lens so as to obtain a wettable surface coating with a good coating durability characterized by surviving at least five consecutive digital rubbing tests.

Although the inventors do not wish to be bound by any particular theory, it is believed that where a non-crosslinkable hydrophilic polymer is incorporated in a silicone hydrogel lens-forming fluid material for cast-molding of lenses, an interfacial film composed of non-crosslinkable hydrophilic polymer can be formed at the interface between the lens-forming material and the molding surface of a mold prior to polymerization (curing). Such interfacial film of non-crosslinkable hydrophilic polymer can become the integral part of the resultant lens if the non-crosslinkable hydrophilic polymer has a high molecular weight or a structure to ensure that portions (e.g., relatively long tails or dangling polymer chain segments) of the non-crosslinkable molecules are entrapped within and become entangled with the polymer matrix of a formed lens. Such interfacial film (or coating) on the lens may not be intact and/or durable. But, by applying an LbL coating on top of this interfacial film at a relatively high temperature (e.g., a temperature of from about 45° C. to about 95° C.), one can obtain a new coating with greatly improved intactness and durability. It is also believed that at a relatively high temperature, the structure of the non-crosslinkable hydrophilic polymer in the interfacial film tends to be extended so as to facilitate the hydrophobic-hydrophobic interactions between the hydrophobic backbones of LbL coating materials and the non-crosslinkable hydrophilic polymer. As such, the LbL coating materials intertwine with non-crosslinkable hydrophilic material to form a new coating on the lens surface to provide improved intactness and durability.

In accordance with the invention, the phrase "applying an LbL coating onto the resultant silicone hydrogel contact lens at a temperature of from about 45° C. to about 95° C." is intended to describe that the LbL coating is formed by contacting the lens with one or more LbL coating solutions having a temperature of from about 45° C. to about 95° C. The temperature of a coating solution is preferably above 50° C., more preferably above about 60° C., even more preferably above about 70° C., most preferably at about 80° C. or above.

In a preferred embodiment, the cast-molding step is carried out at a temperature of from about 45° C. to about 95° C. Cast-molding at a relatively high temperature can ensure that an interfacial film of the non-crosslinkable hydrophilic polymer is formed in a shorter time period at the interface between a silicone-hydrogel lens-forming material and a mold and that greater portions of the non-crosslinkable hydrophilic polymer in the interfacial film can extend into the polymer matrix of a formed lens.

In a further aspect, the invention provides a silicone hydrogel contact lens made according to a method of the invention described above.

The previous disclosure will enable one having ordinary skill in the art to practice the invention. In order to better enable the reader to understand specific embodiments and the advantages thereof, reference to the following examples is suggested.

Example 1

Synthesis of Macromer 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups is found (theory 0.34 meq/g).

The macromer prepared in this way is completely colorless and clear. It can be stored in air at room temperature for several months in the absence of light without any change in molecular weight.

Example 2

Lens formulation A1 comprises the following components: about 40.9% by weight of macromer prepared in Example 1, about 16.4% by weight of TRIS, about 24.6% by weight of DMA, about 17.6% by weight of ethanol, and about 0.5% by weight of Darocure® 1173.

Lens formulation A2 is prepared by adding about 1% by weight of polyvinylpyrrolidone (PVP K90) in the A1 lens formulation.

Lens Formulation A3 is prepared by adding about 5% by weight of PVP K90 in the A1 lens formulation.

Lens Formulation A4 is prepared by adding about 8% by weight of PVP K90 in the A1 lens formulation.

Example 3

Preparation of Polyacrylic Acid (PAA) Solutions

A solution of polyacrylic acid is prepared by adding 1.154 grams (25% PAA solution, 90K, Mw: 72.07 from Poly-science, Inc.) into 4000 ml of water. This solution is divided into 3 parts: B1 (337 ml); B2 (3300 ml); and B3 (363 ml). The pH of B1 is adjusted to pH=6.0; the pH of B2 is adjusted to pH=2.0; the pH of B3 is adjusted to pH=2.0.

Preparation of Poly(allylamine hydrochloride) (PAH) solutions: A solution of PAH of polyacrylic acid is prepared by adding 0.346 grams PAH (Aldrich Mw~70 k) in 3700 ml of water. This solution is divided into 2 parts: C1 (330 ml) and C2 (3370 ml). The pH of C1 is adjusted to pH=2.0; the pH of C2 is adjusted to pH=6.0.

Preparation of PAA/PAH solution: A solution of PAA/PAH is prepared by slowly adding 330 ml of C1 (PAH, pH=2.0) into 3300 ml of B2 (PAA, pH=2.0). Mix thoroughly the resultant solution and then filter the solution.

Preparation of PAH/PAA solution: A solution of PAH/PAA is prepared by slowly adding 337 ml of B1 (PAA, pH=6.0) into 3370 ml of C2 (PAH, pH=6.0). Mix thoroughly the resultant solution and then filter the solution.

Example 4

This example teaches the coating procedures used in the experiments.

Presoak the mold halves (or lenses) for 15 minutes in B3 (PAA solution, pH=2.0) prepared in Example 3, prior to placing them in a tray (i.e., pre-conditioning step). Load the preconditioned mold halves (or lenses) into the carrier trays and agitate for 5 minutes in each solution bath in the following sequence: Bath #1 PA/PAH (pH=2.0); Bath #2 PAH/PAA (pH=6.0); Bath #2 PA/PAH (pH=2.0); Bath #4 PAH/PAA (pH=6.0); Bath #5 PAA/PAH (pH=2.0); Bath #6 PAH/PAA (pH=6.0); Bath #7 PA/PAH (pH=2.0); Bath #8 PAH/PAA (pH=6.0); and Bath #9 PA/PAH (pH=2.0). Transfer mold halves (or lenses) into a saline.

Example 5

Surface Hydrophilicity (Wettability) Tests

Water contact angle on a contact lens is a general measure of the surface hydrophilicity (or wettability) of the contact lens. In particular, a low water contact angle corresponds to more hydrophilic surface. Contact angles (water), both advancing and receding contact angles, of contact lenses are measured by Wilhelmy Plate. The measurements are performed on fully hydrated contact lenses and immediately after blot-drying. Average contact angles are obtained by averaging measurements of three contact lenses.

Coating Intactness Tests

The intactness of a coating on the surface of a contact lens can be tested according to Sudan Black stain test as follows. Contact lenses with a coating (an LbL coating, a plasma coating, or any other coatings) are dipped into a Sudan Black dye solution (Sudan Black in vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated.

Coating Durability Tests

The lenses are digitally rubbed 30 times with Aquify® multi-purpose lens care solution and then rinsed with Softwear® saline. The digitally rubbed lenses are then soaked in Softwear® saline for 30 minutes and the procedure repeated until 30 digital rubbing and soaking cycles had been completed. The lenses are then subjected to Sudan Black test (i.e., coating intactness test described above) to examine whether the coating is still intact.

Example 6

Experiments are carried out to determine the surface hydrophilicity of contact lenses prepared using lens mold halves with an LbL coating and without LbL coating. The results are shown in Table I.

TABLE 1

| Exp. No. | Lens Formulation | Coating of mold halves | Coating Temperature (° C.) | Contact Angles (degrees) | |
|---|---|---|---|---|---|
| | | | | Advancing | Receding |
| 1 | A1 | Yes | Room temperature | 106 ± 3 | 49 ± 3 |
| 2 | A1 | No | N/A | 108 ± 7 | 54 ± 4 |
| 3 | A2 | No | N/A | 108 ± 7 | 54 ± 4 |
| 4 | A3 | No | N/A | 85 ± 9 | 55 ± 8 |
| 5 | A4 | No | N/A | 103 ± 3 | 51 ± 4 |
| 6 | A2 | Yes | Room temperature | 72 ± 4 | 40 ± 11 |
| 7 | A2 | Yes | 80 | 70 ± 9 | 45 ± 8 |
| 8 | A3 | Yes | Room temperature | 46 ± 9 | 40 ± 7 |
| 9 | A3 | Yes | 80 | 51 ± 6 | 48 ± 8 |
| 10 | A1 | No | Room temperature | 29 ± 5 | 21 ± 3 |
| 11 | A1 | No | 80 | 20 ± 6 | 9 ± 9 |
| 12* | A4 | Yes | Room temperature | 90 ± 4 | 43 ± 9 |
| 13* | A4 | Yes | 80 | 82 ± 8 | 41 ± 4 |
| 14 | A1 | Yes | Room temperature | 116 ± 14 | 53 ± 8 |

*At this PVP concentration, PVP did not mix thoroughly with the lens formulation and formed a separate phase.

Polypropylene molds have been used for making lenses. An amount of a lens formulation is introduced into each polypropylene molds and cured for a desired period of time, e.g., from about 15 to about 30 minutes, under UV light to form contact lenses.

Mold halves in experiments 1, 6-9, and 12-13 are coated according to the coating procedure described in Example 4 at a temperature indicated in Table I (coating solution temperature). The resultant mold halves have theoretically 9½ bilayers (PA/(PAH/PAA)$_9$. Those mold halves are then used to cast mold lenses using a lens formulation indicated in Table 1.

Mold halves in experiment 14 are coated by spraying coating using a spray mister as follows. Molds halve are placed on a tray, misted with the 1% PVP k90 solution, and then placed into an oven set at 45° to dry. Once the mold halves are dry, they are removed from the oven and an additional misting is applied on them. This procedure is repeated until a total of 10 b-layers of the PVP k90 had been applied. Mold halves are used for the casting of lenses from lens formulation A1 prepared in Example 2. Mold-lens assemblies (molded lenses with mold halves) are released in a PAA solution (pH 2.0), then extracted for 4 hrs in the PAA solution.

Lenses in experiment 10 and 11 are obtained by cast-molding of lens formulation A1 in mold halves without LbL coating. The molded lenses are coated with an LbL coating according to the procedure described in Example 4. The resultant lenses have theoretically 9½ bilayers (PAA/(PAH/PAA)$_9$.

The results in Table I shows that by using a method of invention (i.e., combination of a transferable LbL coating on mold halves and incorporation of internal wetting agent in a lens formulation), see experiments 6-9, contact lenses with wettable coatings can be produced in a simple, cost effective manner.

It is found that the contact-angle hysteresis can be lowered by combination of a transferable LbL coating on mold halves for making lenses and incorporation of appropriate amounts of internal wetting agent in a lens formulation (experiments 8-9). Contact-angle hysteresis is the difference between the advancing and receding contact angles. Contact angle hysteresis can be used to characterize surface heterogeneity. Where the surface of a contact lens is not chemically homogeneous, there will exist domains with different hydrophilicity or hydrophobicity on the surface. Generally, advancing angles will be sensitive to the hydrophobic domains and receding angles will characterize the hydrophilic domains on the surface, because as the water advances hydrophobic domains will hinder the advancing motion of the contact line, thereby increasing the contact angles, while as the water recedes, the hydrophilic domains will hold back the draining motion of the contact line thus decreasing the contact angle.

It is also found that the higher temperature coating temperature may increase the surface of hydrophilicity of the coating on a contact lens.

Example 7

A. An amount of lens formulation A1 (containing no PVP) prepared in Example 2 is introduced into each polypropylene molds and cured for a desired period of time, e.g., from about 15 to about 30 minutes, under UV light to form contact lenses. The lens molds are not coated with LbL coating. After molding, Mold-lens assemblies (molded lenses with mold halves) are released in a PAA solution (pH 2.0), then extracted for 4 hrs in the PAA solution. After extraction, lenses are autoclaved in phosphate buffer saline (PBS). The averaged contact angle are determined by Wilhelmy plate. The averaged advancing contact angle is 78±5 degrees and the averaged receding contact angle is 30±4 degrees.

B. An amount of lens formulation A2 (containing 1% by weight of PVP) prepared in Example 2 is introduced into each polypropylene molds and cured for a desired period of time, e.g., from about 15 to about 30 minutes, under UV light to form contact lenses. The lens molds are coated with an LbL coating according to the procedure described in Example 4. After molding, Mold-lens assemblies (molded lenses with mold halves) are released in a PAA solution (pH 2.0), then extracted for 4 hrs in the PAA solution. After extraction, lenses are autoclaved in phosphate buffer saline (PBS). The averaged contact angle are determined by Wilhelmy plate. The averaged advancing contact angle is 86.3±9.7 degrees and the averaged receding contact angle is 28.1±8.8 degrees.

C. An amount of lens formulation A3 (containing 5% by weight of PVP) prepared in Example 2 is introduced into each polypropylene molds and cured for a desired period of time, e.g., from about 15 to about 30 minutes, under UV light to form contact lenses. The lens molds are coated with an LbL coating according to the procedure described in Example 4. After molding, Mold-lens assemblies (molded lenses with mold halves) are released in a PAA solution (pH 2.0), then extracted for 4 hrs in the PAA solution. After extraction, lenses are autoclaved in phosphate buffer saline (PBS). The averaged contact angle are determined by Wilhelmy plate. The averaged advancing contact angle is 88.4±3.3 degrees and the averaged receding contact angle is 19.8±8.3 degrees.

D. An amount of lens formulation A1 (containing no PVP) prepared in Example 2 is introduced into each polypropylene molds and cured for a desired period of time, e.g., from about 15 to about 30 minutes, under UV light to form contact lenses. The lens molds are spray-coated with 10 bi-layers of the PVP k90 according to the procedure described in Example 6. After molding, Mold-lens assemblies (molded lenses with mold halves) are released in a PAA solution (pH 2.0), then extracted for 4 hrs in the PAA solution. After extraction, lenses are autoclaved in phosphate buffer saline (PBS).

All lenses prepared above are subjected to coating durability test as described in Example 5. It is observed that after 30 digital rubbing and soaking cycles, all of the tested lenses have staining spots, but the extent of Sudan Black staining for the above prepared lenses B, C and D is smaller than that for lenses A.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method for making a silicone hydrogel contact lens, comprising the steps of:
    (a) obtaining a mold having a first mold half and a second mold half, wherein the first mold half includes a first molding surface and the second mold half includes a second molding surface, wherein the first and second mold halves are configured to receive each other such that a lens-forming cavity is formed between the first molding surface and the second molding surface;
    (b) applying a first transferable LbL coating to the first molding surface and a second transferable LbL coating to the second molding surface, wherein each of the first and second transferable LbL coatings comprises at least one layer of a first polyionic polymeric material and optionally at least one layer of a second polyionic material or a non-charged hydrophilic polymer with a hydrophobic backbone, wherein the first and second polyionic material each have a hydrophobic backbone and multiple ionizable or charged pendant groups, wherein the first and second polyionic materials have charges opposite to each other;
    (c) dispensing a silicone hydrogel lens-forming fluid material into the lens-forming cavity of the mold with the first and second transferable LbL coatings on their molding surfaces, wherein the silicone-hydrogel lens-forming material comprises a non-crosslinkable hydrophilic polymer and at least one member selected from the group consisting of a silicone-containing vinylic monomer, a silicone-containing macromer with ethylenically unsaturated groups, a crosslinkable silicone-containing prepolymer, and mixtures thereof, wherein the non-crosslinkable hydrophilic polymer is capable of forming an interfacial film at an interface between the coated molding surfaces and the lens-forming fluid material;

(d) soaking the transferable LbL coatings with the lens-forming fluid material for a time period sufficient both to allow the non-crosslinkable hydrophilic polymer in the interface film to penetrate into the transferable LbL coatings and to entangle with coating materials in the transferable LbL coatings; and (e) curing the lens-forming material within the lens-forming cavity to form the silicone hydrogel contact lens, whereby the transferable LbL coatings detach from the molding surfaces and reattach to the formed silicone hydrogel contact lens such that said silicone hydrogel contact lens becomes coated with the transferable LbL coatings, wherein the non-crosslinkable hydrophilic polymer has a molecular weight or structure that promotes entanglement of the non-crosslinkable hydrophilic polymer in the interfacial film with the polymer matrix of the formed lens so as to obtain a wettable surface coating with a good coating durability characterized by surviving at least five consecutive digital rubbing tests.

2. The method of claim 1, wherein the silicone hydrogel lens-forming fluid material has a temperature of from about 45° C. to about 95° C.

3. The method of claim 2, wherein each of the first and second transferable LbL coatings comprises at least one layer of the first polyionic polymeric material and at least one layer of the second polyionic material.

4. The method of claim 2, wherein each of the first and second transferable LbL coatings comprises at least one layer of the first polyionic polymeric material and at least one layer of the non-charged hydrophilic polymer with a hydrophobic backbone, wherein the non-charged hydrophilic polymer is selected from the group consisting of a polyvinyl alcohol, a homopolymer of a vinyl lactam, a copolymer of at least one vinyl lactam with one or more hydrophilic vinylic comonomers, and mixtures thereof.

5. The method of claim 4, wherein the non-charged hydrophilic polymer is a polyvinyl alcohol, polyvinylpyrrolidone, or a mixture thereof.

6. The method of claim 2, wherein the first and second transferable LbL coatings are different from each other.

7. The method of claim 2, wherein the silicone hydrogel lens-forming fluid material comprises from about 1% to about 8.0% by weight of the non-crosslinkable hydrophilic polymer, wherein the non-crosslinkable hydrophilic polymer is selected from the group consisting of a polyvinylalcohol, polyethylene oxide, a polyethylene-polypropylene block copolymers, polyamides, a polyimides, a polylactone, a homopolymer of a vinyl lactam, a copolymer of a vinyl lactam, a homopolymer of acrylamide, a homopolymer of methaacrylamide, a copolymer of acrylamide, a copolymer of methacrylamide with one or more hydrophilic vinylic monomers, and mixtures thereof, wherein the number-average molecular weight $M_n$ of a non-crosslinkable hydrophilic polymer is at least 40000 daltons.

8. The method of claim 2, wherein the silicone hydrogel lens-forming material further comprises silver nanoparticles in an amount sufficient to impart to the resultant silicone hydrogel contact lens an antimicrobial activity characterized by having at least a 5-fold reduction ($\geq 80\%$ inhibition).

9. The method of claim 1, wherein the silicone hydrogel lens-forming material comprises a crosslinkable silicone-containing prepolymer and is substantially free of vinylic monomer, wherein the crosslinkable silicone-containing prepolymer is substantially purified prior to preparation of the silicone-hydrogel lens-forming fluid material, wherein the step of curing is carried out under a spatial limitation of actinic radiation to form the contact lens.

10. The method of claim 1, wherein each of the first and second transferable LbL coatings comprises at least one layer of the first polyionic polymeric material and at least one layer of the second polyionic material.

11. The method of claim 1, wherein each of the first and second transferable LbL coatings comprises at least one layer of the first polyionic polymeric material and at least one layer of the non-charged hydrophilic polymer with a hydrophobic backbone, wherein the non-charged hydrophilic polymer is selected from the group consisting of a polyvinyl alcohol, a homopolymer of a vinyl lactam, a copolymer of at least one vinyl lactam with one or more hydrophilic vinylic comonomers, and mixtures thereof.

12. The method of claim 11, wherein the non-charged hydrophilic polymer is a polyvinyl alcohol, polyvinylpyrrolidone, or a mixture thereof.

13. The method of claim 1, wherein the first and second transferable LbL coatings are different from each other.

14. The method of claim 1, wherein the silicone hydrogel lens-forming fluid material comprises from about 1% to about 8.0% by weight of the non-crosslinkable hydrophilic polymer, wherein the non-crosslinkable hydrophilic polymer is selected from the group consisting of a polyvinylalcohol, polyethylene oxide, a polyethylene-polypropylene block copolymers, polyamides, a polyimides, a polylactone, a homopolymer of a vinyl lactam, a copolymer of a vinyl lactam, a homopolymer of acrylamide, a homopolymer of methaacrylamide, a copolymer of acrylamide, a copolymer of methacrylamide with one or more hydrophilic vinylic monomers, and mixtures thereof, wherein the number-average molecular weight $M_n$ of a non-crosslinkable hydrophilic polymer is at least 40000 daltons.

15. The method of claim 1, wherein the silicone hydrogel lens-forming material further comprises silver nanoparticles in an amount sufficient to impart to the resultant silicone hydrogel contact lens an antimicrobial activity characterized by having at least a 5-fold reduction ($\geq 80\%$ inhibition).

16. The method of claim 9, wherein the silicone hydrogel lens-forming fluid material has a temperature of from about 45° C. to about 95° C.

17. The method of claim 16, wherein each of the first and second transferable LbL coatings comprises at least one layer of the first polyionic polymeric material and at least one layer of the second polyionic material.

18. The method of claim 16, wherein each of the first and second transferable LbL coatings comprises at least one layer of the first polyionic polymeric material and at least one layer of the non-charged hydrophilic polymer with a hydrophobic backbone, wherein the non-charged hydrophilic polymer is selected from the group consisting of a polyvinyl alcohol, a homopolymer of a vinyl lactam, a copolymer of at least one vinyl lactam with one or more hydrophilic vinylic comonomers, and mixtures thereof.

19. The method of claim 18, wherein the non-charged hydrophilic polymer is a polyvinyl alcohol, polyvinylpyrrolidone, or a mixture thereof.

20. The method of claim 16, wherein the first and second transferable LbL coatings are different from each other.

* * * * *